(No Model.)
M. R. JONES.
Picture and Clothes Hook.
No. 241,991.  Patented May 24, 1881.
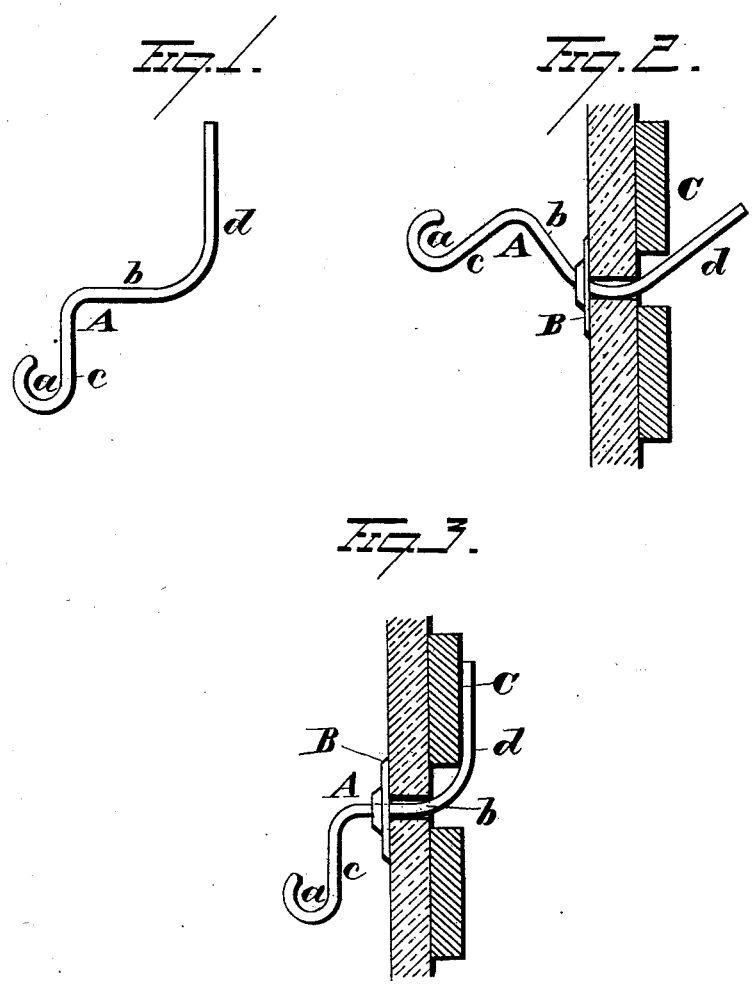
WITNESSES
E. J. Nottingham
A. L. Lawrence
INVENTOR
Matthew R. Jones.
By H. A. Seymour,
ATTORNEY
N. PETERS, Photo-Lithographer, Washington, D. C.

UNITED STATES PATENT OFFICE.

MATTHEW R. JONES, OF MARSHFIELD, ASSIGNOR TO ISAAC A. WILSON, OF ZANESVILLE, OHIO.

PICTURE AND CLOTHES HOOK.

SPECIFICATION forming part of Letters Patent No. 241,991, dated May 24, 1881.

Application filed February 1, 1881. (No model.)

*To all whom it may concern:*

Be it known that I, MATTHEW R. JONES, of Marshfield, in the county of Athens and State of Ohio, have invented certain new and useful Improvements in Picture and Clothes Hooks; and I do hereby declare the following to be a full, clear, and exact description of the invention, such as will enable others skilled in the art to which it pertains to make and use it, reference being had to the accompanying drawings, which form part of this specification.

My invention relates to an improvement in picture and clothes hooks.

The object of the invention is to provide a hook of such construction that it may be readily secured to a plastered wall without defacing the wall, and when secured in place shall be strong and capable of supporting pictures or other objects or material.

To this end my invention consists, essentially, in a hook having a curved shank or attaching end, which is adapted to be inserted in a perforation in the plaster wall and engage with one of the laths, whereby the hook is braced and rendered strong and durable.

In the accompanying drawings, Figure 1 is a view in perspective of my improvement in hooks. Fig. 2 is a view showing the hook being inserted in place, and Fig. 3 shows the hook properly secured in place.

A represents my improvement in hooks, which is formed with a hook or bent portion, $a$, at one end. The hook portion $a$ may be of any desired shape, according to the particular purpose for which the hook is intended for use. If it is to be used for supporting pictures, the hook portion $a$ should be small, so as to receive and retain a wire or cord. If it is to be used as a clothes-hook, the bent or hook portion $a$ will be made larger and of proper form to enable clothing to be readily supported thereon. The central portion, $b$, of the hook is straight and bent at right angles to the depending arm $c$. The rear or attaching end, $d$, is of curved form and of any desired length.

B is a washer, the function of which will be hereinafter explained.

The hook is applied as follows: The plastered wall is perforated with an awl or other instrument at any desired point, care being taken that the perforation be made between two laths, which can readily be done by sounding the wall. The washer B is then slipped over the attaching end of the hook and the latter portion then inserted in the perforation in the wall. After the attaching end has been inserted in place the hook is turned around into proper position, and thus the attaching end is turned so as to engage with the rear surface of the lath C, located above the hook, whereby the hook is firmly braced and rendered secure, while the washer B serves to conceal the hole in the wall, and also forms an ornamental finish to the article.

It will readily be observed that this construction of hook is by far superior to nails as a fastening, because the hook may be attached to the plastered wall without loosening the plastering or defacing the wall, may be easily removed and readjusted, and, further, presents an ornamental and finished appearance.

The hook may be constructed of wire, as shown, or it may be made of cast metal, or it may be cut or stamped from sheet metal.

It is evident that many slight changes in the construction and arrangement of parts might be resorted to without departing from the spirit of my invention, and hence I do not limit myself to the exact construction shown and described; but, Having fully described my invention, what I claim as new, and desire to secure by Letters Patent, is—

A hook consisting of the hook portion on its forward end, and having the curved attaching portion $b\ d$, substantially as set forth.

In testimony that I claim the foregoing I have hereunto set my hand this 1st day of January, 1881.

MATTHEW R. JONES.

Witnesses:
 E. H. JAMES,
 JOHN BODEN.